(12) United States Patent
Bolle et al.

(10) Patent No.: US 11,336,651 B2
(45) Date of Patent: May 17, 2022

(54) TECHNIQUE FOR CONFIGURING A SYSTEM COMPRISING AT LEAST ONE DEVICE

(71) Applicant: ORANGE, Issy-les-Moulineaux (FR)

(72) Inventors: Sebastien Bolle, Chatillon (FR); Vincent Rouault, Chatillon (FR); Xavier Roubaud, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 195 days.

(21) Appl. No.: 16/470,775

(22) PCT Filed: Dec. 11, 2017

(86) PCT No.: PCT/FR2017/053490
§ 371 (c)(1),
(2) Date: Jun. 18, 2019

(87) PCT Pub. No.: WO2018/115633
PCT Pub. Date: Jun. 28, 2018

(65) Prior Publication Data
US 2020/0092297 A1 Mar. 19, 2020

(30) Foreign Application Priority Data
Dec. 19, 2016 (FR) ...................... 1662750

(51) Int. Cl.
*G06F 9/445* (2018.01)
*H04L 67/306* (2022.01)
*H04L 29/06* (2006.01)

(52) U.S. Cl.
CPC ........ *H04L 63/102* (2013.01); *G06F 9/44505* (2013.01); *H04L 63/20* (2013.01); *H04L 67/306* (2013.01)

(58) Field of Classification Search
None
See application file for complete search history.

(56) References Cited

U.S. PATENT DOCUMENTS 10,083,291 B2 * 9/2018 James ................... H04L 9/3268
10,257,184 B1 * 4/2019 Mehta ................... H04L 63/083
(Continued)

FOREIGN PATENT DOCUMENTS

EP 2145499 A1 1/2010
WO 20080135405 A1 11/2008

OTHER PUBLICATIONS

SAREF standing for "Smart Appliance REFerence") as described at http://ontology.tno.nl/saref/.
(Continued)

*Primary Examiner* — Davoud A Zand
(74) *Attorney, Agent, or Firm* — David D. Brush; Westman, Champlin & Koehler, P.A.

(57) ABSTRACT

A method and configuration device for configuring a system having at least one device. A moving user is authorised to access this system, referred to as the visited system. Information data representing a nominal configuration in a reference system are obtained b the configuration device, this nominal configuration having a piece of information relating to a configured service and at least one configuration rule of a device contributing to the provision of the service. The configuration device then determines a configuration of the service in the visited system and at least one device of the visited system as a function of the nominal configuration obtained and applies this configuration.

7 Claims, 2 Drawing Sheets

(56) References Cited

U.S. PATENT DOCUMENTS

| | | | |
|---|---|---|---|
| 10,516,667 B1* | 12/2019 | Roth | G06F 21/31 |
| 10,705,945 B1* | 7/2020 | Stickle | G06F 9/5061 |
| 2005/0198247 A1* | 9/2005 | Perry | H04L 7/0008 |
| | | | 709/223 |
| 2013/0091279 A1 | 4/2013 | Haddad et al. | |
| 2015/0143456 A1* | 5/2015 | Raleigh | H04W 12/088 |
| | | | 726/1 |
| 2015/0154850 A1 | 6/2015 | Fadell et al. | |
| 2016/0337356 A1* | 11/2016 | Simon | H04L 63/10 |
| 2017/0019409 A1* | 1/2017 | Shalunov | H04L 63/102 |

OTHER PUBLICATIONS

English translation of the Written Opinion of the International Searching Authority dated Jan. 26, 2018 for corresponding International Application No. PCT/FR2017/053490, filed Dec. 11, 2017.
International Search Report dated Jan. 26, 2018 for corresponding International Application No. PCT/FR2017/053490, filed Dec. 11, 2017.
Written Opinion of the International Searching Authority dated Jan. 26, 2018 for corresponding International Application No. PCT/FR2017/053490, filed Dec. 11, 2017.

* cited by examiner

TECHNIQUE FOR CONFIGURING A SYSTEM COMPRISING AT LEAST ONE DEVICE

CROSS-REFERENCE TO RELATED APPLICATIONS

This Application is a Section 371 National Stage Application of International Application No. PCT/FR2017/053490, filed Dec. 11, 2017, the content of which is incorporated herein by reference in its entirety, and published as WO 2018/115633 on Jun. 28, 2018, not in English.

FIELD OF THE DISCLOSURE

The invention relates to the general field of telecommunications.

The invention relates more particularly to a technique for configuring a system comprising at least one device. More specifically, this technique is implemented when a user accesses this system, called visited system.

BACKGROUND OF THE DISCLOSURE

An increasingly widespread use of systems is being observed, for example home automation systems, in which a user can configure services which are provided to him or her, the devices which offer these systems and rules of use in this system. As an example, the home automation network of a residence comprises measurement sensors and home automation devices. Management rules for controlling the home automation devices can be defined, by taking into account the data supplied by the sensors or the devices themselves. These management rules can relate to security, lighting, heating, parental control, etc. To perform this configuration, the user must therefore define these various management rules, and can change them over time in order to better adapt them to his or her needs. Still by way of example, a personal vehicle memorizes settings for a user: seat, rearview mirror, seat belt, onboard computer. Thus, the user is accustomed to restoring, in his or her own system, called reference system, a nominal configuration of its services and of the devices contributing to the provision of its services. When this user temporarily leases a residence, for example for the holidays, he or she must configure the visited home automation system to restore his or her usual environment. This configuration is lengthy and tedious. The same applies when this user temporarily leases a vehicle.

SUMMARY

One of the aims of the invention is to remedy the inadequacies/drawbacks of the state of the art and/or to provide enhancements thereto.

According to a first aspect, the subject of the invention is a method for configuring a system comprising at least one device. This method comprises:
  an authorization for a user to access said system, called visited system;
  an acquisition for said user of information data representative of a nominal configuration in a reference system, said nominal configuration comprising information relating to a configured service and to at least one configuration rule of a device contributing to the provision of said service;
  a configuration of the service in the visited system and of at least one device of the visited system as a function of the nominal configuration acquired.

By virtue of the configuration method, the user can thus restore, in a visited system, a configuration that he or she had set up for a service in his or her reference system. This configuration also comprises the configuration of a device contributing to the implementation of the service as well as associated usage rules. This configuration in the reference system, called nominal configuration, corresponds equally to a local configuration (for example in the residence of the user) and to a hybrid configuration also comprising a configuration of the service in a remote server.

For example, when a user takes control of a new vehicle, his or her telephone automatically switches to a "hands-free" mode with his or her favorite numbers. Still by way of example, when the user leases a residence for the holidays, the rules used in his or her home adapt automatically to take account of the configuration of the reference system: the badge, which is used to secure access to his or her home, operates directly with this accommodation. It is not therefore necessary to understand and to manually do all the configuration of the local home automation solution.

The configuration technique is based on a digital profile associated with a user, called personal digital profile, comprising the nominal configuration, that is to say the configuration rules and the usage profiles of the services, such that the system can be configured according to the user. The nominal configuration thus corresponds to the usage data and preferably of a user, and the rules, parameters, properties of his or her devices, services which are useful to the configuration or the reconfiguration of the visited system.

a particular embodiment, the configuration is based on a description of the services and of the devices according to an interpretable configuration template format. Additionally, the reference and visited systems have application programming interfaces API. These programming interfaces thus make it possible to apply the configuration. The use of this format and of these programming interfaces makes it possible to implement the configuration method, even if the providers of the service and/or of the devices are not the same between the reference and visited systems.

The configuration technique thus makes it possible to render a personal digital profile associated with a user, that is to say the configuration rules and usage profiles of the services for this user, transportable, such that a visited system can be configured as a function of the personal digital profile of this user. In a particular embodiment, this personal digital profile is memorized in a remote device accessible via a wide area communication network. In another embodiment, this personal digital profile is memorized in a personal object of the user, for example a secure key or a mobile terminal. This personal digital profile is configured to be able to be interpreted by and applied to different service providers. For example, the usage rules for a music service that a user has configured in his or her home can also be applied to another music service available in a visited system. Still by way of example, the configuration of a rental vehicle (seat, rearview mirror, temperature, radio station, driving assistance, etc.) is adapted to the user as a function of the configuration in his or her own vehicle, even if the vehicles and the internal equipment are of different makes.

The configuration technique makes it possible to simplify the experience of the users of surrounding connected electronic systems and services by allowing for an automatic and dynamic configuration taking account of the local context of the visited system and as a function of a nominal configuration.

The various embodiments or features mentioned hereinbelow can be added independently or in combination with one another, to the configuration as defined previously.

In a particular embodiment, the configuration method further comprises an acquisition of an inventory of the visited system, said inventory comprising, for a service offered in the visited system, a service configuration template and, for a device contributing to the provision of a service, a device configuration template.

This inventory is acquired when the visited system is discovered and covers all of the services, devices and rules available in the visited system.

This inventory makes it possible to implement the configuration method for a service which is offered in the visited system. Thus, the configuration is performed for a service configured in the reference system and which can be offered by a service which is at least functionally equivalent in the visited system.

According to a particular feature, the configuration method further comprises an acquisition of an inventory of the visited system for a given service, said inventory comprising, for said service, a service configuration template and, for a device contributing to the provision of the service, a device configuration template.

An explicit search for a given service can thus be triggered when it has not been discovered in establishing the inventory.

This makes it possible to add to the inventory with configuration templates in the visited system for a service which is configured in the reference system.

In a particular embodiment, the configuration method comprises an acquisition of a configuration to be applied for a service offered in the visited system and absent from the nominal configuration acquired.

This makes it possible to configure a service which is offered in the visited system although not in the reference system. In a particular implementation, the configuration is acquired by means of a human-machine interface with the user. In another particular implementation, the configuration is acquired from a server managed by the operator administering the reference system.

In a particular embodiment of the configuration method, the configuration of the service in the visited system and of said at least one device of the visited system is determined also as a function of a security rule defined in the visited system.

This makes it possible to guarantee that security rules applicable in the visited system will be taken into account whatever the configuration determined as a function of the nominal configuration acquired. The determined configuration cannot infringe the security rules of the visited system.

According to a second aspect, the invention relates to a device for configuring a system comprising at least one device, said configuration device comprising:

an authorization module, arranged to obtain an authorization for a user to access a system, called visited system;

a module for acquiring a nominal configuration, arranged to acquire, for an authorized user, information data representative of the nominal configuration in a reference system, said nominal configuration comprising information relating to a configured service and to at least one configuration rule of a device contributing to the provision of said service;

a configuration module, arranged to configure a service in the visited system and at least one device of the visited system as a function of the nominal configuration acquired.

The advantages stated for the configuration method according to the first aspect can be directly transposed to the configuration device.

According to a third aspect, the invention relates to a program for a configuration device, comprising program code instructions intended to control the execution of the actions of the configuration method previously described implemented by the configuration device, when this program is run by this device and a storage medium that can be read by a configuration device on which is stored a program for a configuration device.

The advantages stated for the configuration method according to the first aspect can be directly transposed to the program for a configuration device and to the storage medium.

BRIEF DESCRIPTION OF THE DRAWINGS

The technique for configuring a system will be better understood with the aid of the following description of particular embodiments, referring to the attached drawings in which.

DETAILED DESCRIPTION OF ILLUSTRATIVE EMBODIMENTS

Figure 1:
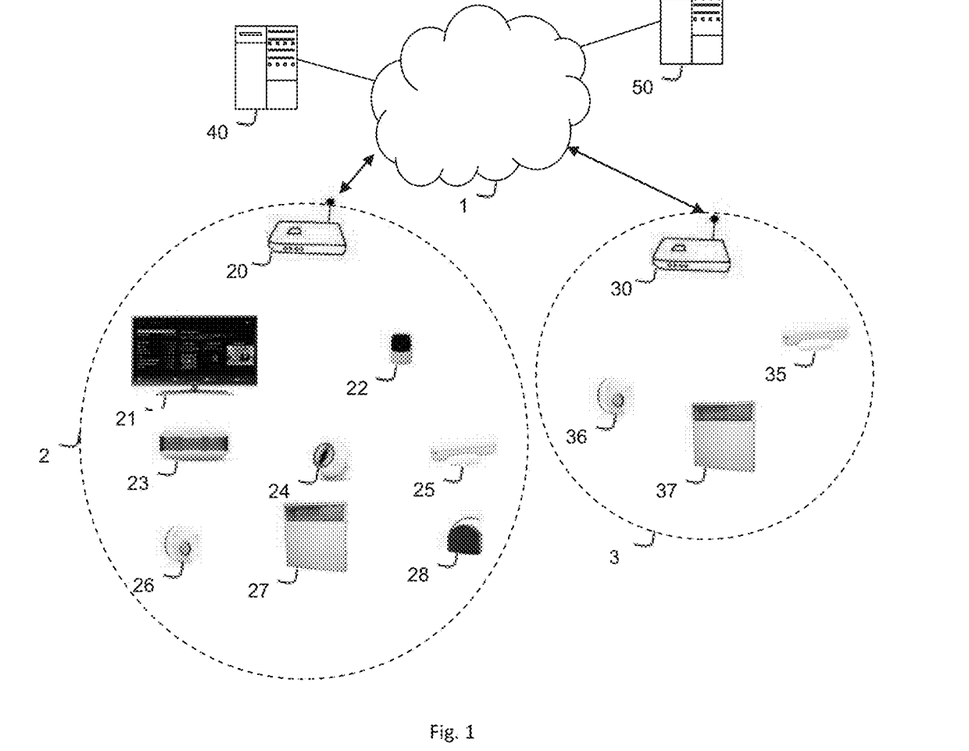
FIG. 1 represents an environment of systems in a particular embodiment.

FIG. 1 represents an environment of systems in a particular embodiment. A first system 2 corresponds to a so-called reference system. This reference system 2 comprises devices, capable of implementing one or more services for a user U. This reference system 2 comprises in particular:

an access device 20 to a wide-area communication network 1, for example the Internet network, via an access network (not represented);

a television 21;

a video surveillance camera 22;

a smoke detector 23;

a motion detector 24;

a door opening detector sensor 25;

a thermostat 26;

a radiator 27;

a shutter control unit 28.

It is stressed here that this is purely an illustrative example.

The access network can be a mobile cellular network, for example of 2G, 3G, 4G, 5G type, or an xDSL access network, or even an optical access network. There is no limitation as to the type of access network.

FIG. 1 also shows a second system 3, hereinafter called visited system. This visited system 3 comprises in particular:

an access device 30 to the wide-area communication network 1 via an access network (not represented);

a door opening detector sensor 35;

a thermostat 36;

a radiator 37.

It is stressed here that these devices are represented identically between the two systems. This representation targets the function of the device and not its physical form or its manufacturer.

A personal digital profile management server 40 is in particular arranged to acquire, via the communication network 1, from the reference system 2 for a user, information data representative of a nominal configuration in the system 2. These information data are memorized in an interpretable format, as described later, then forming a personal digital profile. The server 40 is arranged to memorize the personal digital profile of the user U associated with the reference system 2.

A personal digital profile comprises information data such as configuration rules for the devices of his or her reference system 2, for the services implemented in his or her reference system 2 and service usage profiles, in an interpretable format.

A configuration server 50 is in particular arranged to acquire from the server 40 information data representative of a nominal configuration in the reference system 2 for a user, to determine a configuration to be applied in a visited system by this user and to configure the visited system 3 as a function of the determined configuration.

The reference system 2 and visited system 3 have application programming interfaces API. These programming interfaces thus make it possible to apply the configuration, in particular in the visited system 3, once the latter has been determined. The use of these programming interfaces contributes to the implementation of the configuration method, even if the providers of the service and/or of the devices are not the same between the reference and visited systems.

Figure 3:
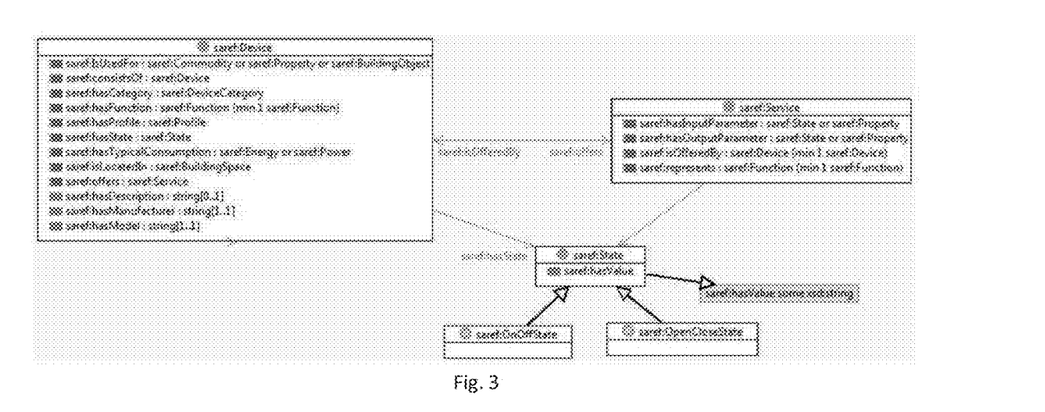
FIG. 3 represents a description of service and of devices according to an interpretable template format in a particular embodiment.

FIG. 3 represents an example of semantic description of a data structure comprising a device and a service.

The graphs are tools that make it possible to easily and summarily represent information data, and in particular the concepts contained in these data as well as the relationships linking these concepts to one another. The set of the concepts and of the relationships linking these concepts to one another is also known as ontology. More specifically, in order to guarantee the consistency and the correct interpretation of the templates, the RDF (Resource Description Framework) language is based on the definition and the use of ontologies, which are themselves RDF templates defining types of data or of objects under which the concepts contained in each item of information fall. An ontology, in a computing context, denotes a conceptualization of a domain of knowledge. Conceptualization is understood here to mean the definition of the terms which are necessary to express the meaning of an item of information falling within this domain and the properties of these terms. The terms include the types of object (or classes) and the relationships between these types of object. A property of a relationship is for example its transience. In other words, an ontology denotes both a choice as to how to describe a domain, and the formal description of this domain. The ontologies are commonly used in domains such as artificial intelligence, the semantic web, software engineering, interworking between multi-vendor systems, etc.

Such an approach makes it possible to define a service without being tied to the supplier of a connected device. Access to a service is then achieved by means of a description conveying meaning.

The example represented in FIG. 3 is derived from the SAREF ontology (SAREF standing for "Smart Appliance REFerence") as described at http://ontology.tno.nl/saref/).

The devices are objects arranged to provide or contribute to the provision of one or more functions in a residence, public places or offices. The SAREF ontology offers a list of basic functions which can possibly be combined to obtain a more complex function. A device offers a service, which is a representation of a function in a network, which makes the function discoverable, registerable and remotely controllable by other devices in the network. A service can represent one or more functions. A service is offered by a device that wants its functions to be discoverable, registerable and remotely controllable by other devices in the network.

Such a data structure is for example modeled by a graph.

A service must specify the device that is offering the service, the function to be represented, and the input and output parameters for implementing the service. As an illustration, the service saref:Service is represented by a set of information data, corresponding to object properties:

saref:hasInputParameter a link identifying the input parameter of a service;

saref:hasOutputparameter a link identifying the output parameter of a service;

saref:isOfferedBy a link between a service and a device which offers the service;

saref:represents a link between a service and a function.

The device saref Device is represented by a set of information data:

object properties:

saref:IsUsedFor a link specifying the purpose for which the device is used;

saref:consistsOf a link indicating a composite entity which comprises several other entities;

sarethasCategory a link between an entity (such as a device or a function) and a category;

saref:hasFunction a link identifying the type of function of a device;

saref:hasProfile a link associating a profile with an entity, for example a device;

saref:hasState a link identifying the type of state of a device;

saref:hasTypical Consumption a link identifying the typical consumption of a device;

saref:isLocatedIn a link between a device and a constructed space in which it is located;

saref:offers a link between a device and a service;

data type properties:

saref:hasDescription a link providing a description of an entity (for example a device);

saref:hasManufacturer a link identifying the manufacturer of an entity (for example a device);

saref:hasModel a link identifying the model of an entity (for example a device).

For example, information data according to which "the service is offered by the device" can be modeled by a graph comprising two nodes associated respectively with the "Device" class (saref Device in FIG. 3) and with the "Service" class (saref:Service), and an arc linking the "Service" node to the "Device" node whose meaning is "is offered by" ("isOfferedBy"). Similarly, information data according to which "the device offers the service" can be modeled by a graph comprising the two nodes associated respectively with the "Device" class and with the "Service" class, and an arc linking the "Device" node to the "Service" node whose meaning is "offers" ("offers").

Information data according to which "the service has a state" can be modeled by a graph comprising the two "Service" and "State" nodes, and an arc linking the "Service" node to the "State" node whose meaning is "has a state" ("hasState"). The same applies for "the device has a state" modeled by an arc linking the "Device" node to the "State" node.

The personal digital profile thus comprises, for each configured service, the applicable service configuration template, the graph linking this service to the devices offering the service, the applicable device configuration template, the usage data and preferably of these services and devices.

The provision of the configuration service is based on this semantic description of the services, of the devices and of the usage rules. It can thus be provided in the network of an operator when these semantic descriptions are provided for both reference and visited systems. It is also applicable when two operators providing this configuration service use a common semantic description of the services, of the devices and of the usage rules, or of the at least one interpretable semantic description thereof.

The SAREF ontology is given here by way of illustration. Other ontologies can also be used. In the general field of sensors, ontologies that can be cited are the SSN ("Semantic Sensor Network") ontology defined by the SSN-XG group of the W3C ("World Wide Web Consortium") and described at the address https://www.w3.org/2005/Incubator/ssn/ssnx/ssn. In the home automation field, an ontology that can be cited is the DogOnt ("Domotic Gateway Ontology") ontology described at the address http://elite.polito.it/ontologies/dogont/dogont.html. In the field of connected objects, an ontology that can be cited is the IoT-Thing ontology described at the address https://www.irit.fr/recherches/MELODI/ontologies/IoT-O.html#IoT_Thing.

Figure 2:
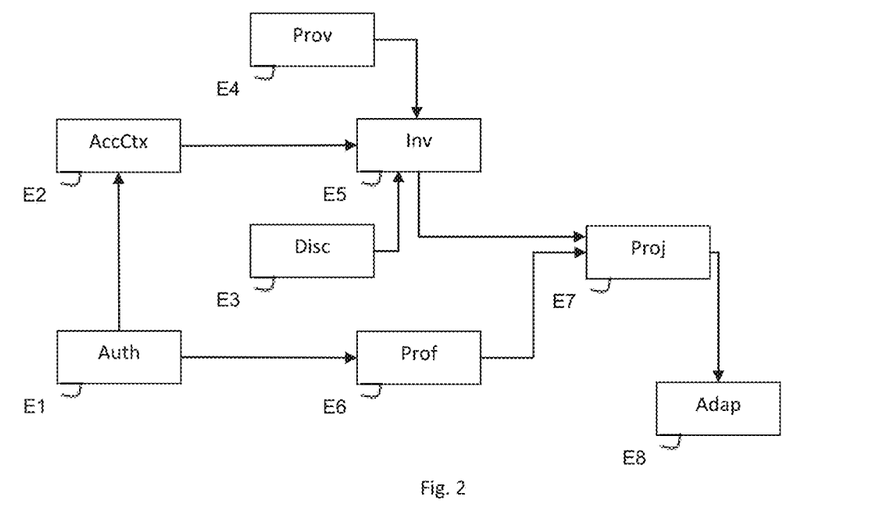
FIG. 2 illustrates steps of a configuration method according to a particular embodiment.

FIG. 2 illustrates steps of the method for configuring a system comprising at least one device. This system 3 corresponds to a visited system. More specifically, a user U moves and accesses the visited system. This access is performed for example by means of a mobile terminal. Generally, a terminal connected to the Internet network makes it possible to perform this access. The user has subscribed to a roaming system configuration service from an operator of such a service.

In a preliminary step, not represented in FIG. 2, the user has accessed his or her reference system 2. In these various accesses, the user has used his or her mobile terminal to configure the services offered in his or her reference system, the devices contributing to the provision of these services and the usage rules in the reference system 2. This configuration, called nominal configuration, is represented in an interpretable format and thus comprises at least one item of information relating to a service configured in the reference system and at least one configuration rule of a device contributing to the provision of this service. It is stressed here that a service can also be provided in a device located in a communication network (in the "cloud"). In this case, the personal digital profile also comprises information relating to this type of service. In the embodiment described, this nominal configuration is memorized in the form of the personal digital profile of the user U in the personal digital profile management service 40.

In a step E1, the user is authenticated by a configuration service operator via his or her mobile terminal. Then, in a step E2, the user is authorized to access the visited system 3 by the configuration service operator. It is stressed here that the two reference and visited systems are not necessarily administered by one and the same operator and that, in this case, the two operators can have entered into an agreement with one another to accommodate the users of the other operator. In this embodiment, exchanges (not represented in FIG. 2) take place between the two operators in order to implement these steps E1 and E2.

In a step E3, a phase of discovery of the visited system 3 is performed. During this phase, a service configuration template is obtained for a service offered in the visited system and a device configuration template is also acquired for a device contributing to the provision of a service. Thus, the services, the devices and the rules locally available in the visited system 3, available to be configured, are registered for the visited system 3. These discovered information data form an inventory. It is stressed here that a service can also be provided in a remote device located in a communication network accessible via the Internet (in the cloud). The inventory also registers the configuration information for this type of service.

This step E3 can be triggered by the user by means of the human-machine interface of his or her terminal to discover the visited system as a whole.

It is stressed here that certain services, devices or rules locally available may be excluded from this discovery phase, when access to the latter is limited by an accommodation restriction rule, that is to say that they are not available for a roaming user.

The result obtained following this step E3 can also be displayed on the human-machine interface of the terminal, in order for the user to be able to view the visited system 3.

In the embodiment described, this step E3 is executed following the access authorization for the user. In another embodiment, this step E3 is executed periodically in the visited system 3. In other embodiments, this step E3 is executed when a modification is made in the visited system 3.

This step E3 is for example executed by the access gateway 30.

In a particular embodiment, in a step E4, the user adds to this inventory by configuring certain services and/or devices which have not been registered or only partially registered. This configuration can be performed by means of a human-machine interface.

In a step E5, the configuration server 50 acquires the inventory of the visited system 3, acquired in the step E3 and possibly complemented in the step E4. In a particular embodiment, the inventory is received from the access gateway 30. In another particular embodiment, the inventory has been memorized in a memory area situated in the network of the operator of the visited system 3 following the execution of the step E3 (complemented if necessary by the step E4) and is requested by the configuration server 50 upon the execution of the step E5.

In a step E6, the configuration server 50 acquires from the management server 40 the personal digital profile of the user, that is to say information data representative of a nominal configuration for this user in his or her reference system 2. It is recalled that this nominal configuration comprises information relating to a configured service and at least one configuration rule of a device contributing to the provision of said service.

In a step E7, the configuration server 50 performs a projection of the content of the inventory onto the digital profile of the user. To perform this projection, the configuration server 50 performs, in particular, a semantic interpretation of the content of the inventory and selects configuration templates memorized in the personal digital profile to map them with those of the inventory. For example, if a service described in the personal digital profile is offered in the visited system 3, that is to say is present in the content of the inventory, a mapping of the configuration templates is performed, in order to make it possible to configure this service. If a service described in the personal digital profile is not offered in the visited system, it is not retained. Thus, on completion of this step E7, the service or services for which a configuration is defined in the personal digital profile and which are offered in the visited system are retained.

In a step E8, the configuration server 50 determines a configuration for the service or services determined in the step E7 as a function of the nominal configuration, that is to say the personal digital profile. More precisely, the configuration server 50 determines, from the mapping, the configuration to be applied in the visited system 3. Then, the configuration server 50 configures the services in the visited system 3 by means of the programming interface. This configuration also comprises the configuration of the device or devices contributing to the provision of the service and of the usage rules in the visited system. This configuration instantiates the configuration templates as a function of configuration information from the personal digital profile. The configuration server 50 transfers them to the visited system 3 and controls their installation. This allows the user to restore a service execution environment in the visited system corresponding to that which he or she has in his or her reference system, at least for the services and devices available. A roaming service is thus offered to the user. This roaming can be effected for a variety of environments, such as a home automation network environment, a driving assistance environment in a vehicle, etc.

As an illustration, it is assumed that a temperature setting service S is offered in the reference system 2. This service S consists in triggering the radiator 27 on detection of an opening of a door by the device 25 when the temperature recorded by the thermostat 26 is below a threshold value. It is stressed that other services are also offered in the reference system 2 but are not described. This service is described as being offered by the access gateway 20 and is linked with the door opening detector device 25 ("detection" function), thermostat device 26 ("temperature" function) and radiator device 27 ("on/off" function).

The user requests access to the visited system 3 and acquires it (step E2). Following the execution of the step E3, the inventory comprises the services, the devices and the rules available in the visited system 3. The access gateway device 30, door opening detector device 35, thermostat device 36 and radiator device 37 are identified as being available and their configuration templates are obtained. The configuration server 50 in particular performs a semantic interpretation of the content of the inventory and selects configuration templates memorized in the personal digital profile to map them with those of the inventory (step E7). Then, the configuration server 50 determines the configuration to be put in place in the visited system 3 to offer the service S.

Still by way of illustration, it is possible for the user to access a music list, defined for a first music rendering service, upon the execution of a second music rendering service in a visited system.

In a particular embodiment, the configuration of the service in the visited system and, if appropriate, of a device of the visited system, is determined also as a function of a security rule defined in the visited system. In effect, this or these security rules defined in the visited system take priority over the configuration of the service for the user.

As an illustrative example, the owner of a residence in which the visited system is deployed does not want the entry door to be able to be opened automatically when the residence is leased or else for the thermostat 36 to be able to be set to a temperature higher than a threshold value.

Still as an illustrative example, a security rule corresponds to the configuration of an alarm system of the visited system requiring parameters linked to the specificity of the places, such as a number of entries of the visited place, a time delay on the sensors and on the alarms as a function of the number of entries, etc.

In a particular embodiment, the configuration server 50 acquires from the user, via a human-machine interface, a configuration to be performed for a service not described in the personal digital profile, this service being offered in the visited system and absent from the nominal configuration acquired. Then, the server 50 then configures this service in the visited system. This configuration can also be memorized in the personal digital profile with the server 40, in order to be used in another visited system, if necessary.

In a particular embodiment, the configuration server 50 acquires, from a server managed by the operator administering the reference system, a configuration to be performed for a service not described in the personal digital profile, this service being offered in the visited system and absent from the nominal configuration acquired. Then, the server 50 then configures this service in the visited system. This makes it possible to apply a default configuration to a service not described in the personal digital profile.

In the embodiments described, the configuration server 50 executes in particular the steps E7 and E8. In another embodiment, these two steps are performed by the access gateway 30 to the visited system, or any other device of this system (for example in a home automation management device). In another embodiment, these two steps are performed by the access gateway 20 of the reference system (or any other device of this system, such as a home automation management device), which then controls the configuration of the visited system 3, for example via a remote service situated in the network of an operator.

In the embodiment described, the personal digital profile is memorized in the personal digital profile management server 40. This makes it possible to make it accessible remotely. In another embodiment, the personal digital profile is memorized in a memory area of the access gateway 20 or in a home automation management device of the reference system 2. In another embodiment, the personal digital profile is memorized in a personal object of the user, for example an electronic key or a mobile terminal. This allows the user to make his or her personal digital profile accessible by the access gateway of the visited system. For security reasons, the personal digital profile can be memorized in a secure zone.

There is no limitation as to the different embodiments and the person skilled in the art is capable of defining others thereof that make it possible, using a personal digital profile, representing configuration templates for a service and for a device acquired for a reference system, to configure a visited system as a function of this profile.

Figure 4:
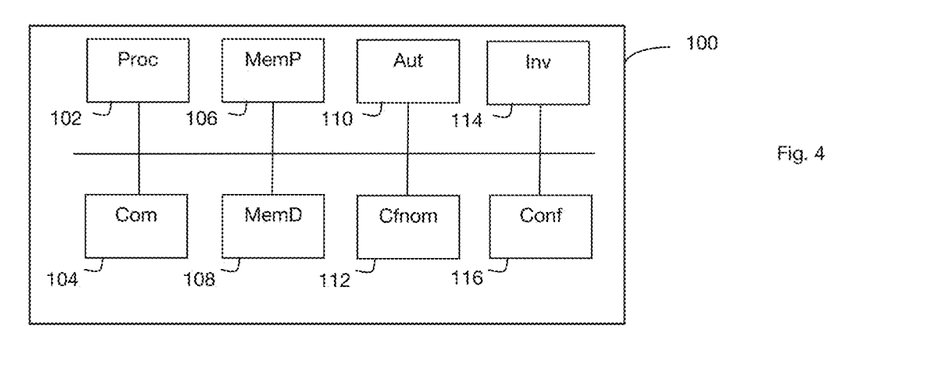
FIG. 4 represents a configuration device according to a particular embodiment.

FIG. 4 schematically illustrates a configuration device 100 in a particular embodiment. The configuration device 100 comprises in particular:

- a processor 102 for executing code instructions of software modules;
- a communication module 104, forming a communication interface with one of other devices or servers;
- a memory area 106, arranged to memorize a program which comprises code instructions implementing the steps of the configuration method;

a storage memory 108, arranged to store useful data upon the implementation of the configuration method;

an authorization module 110, arranged to acquire an authorization for a user to access a system, called visited system;

a module 112 for acquiring a nominal configuration, arranged to acquire, for an authorized user, information data representative of the nominal configuration in a reference system, said nominal configuration comprising information relating to a configured service and to at least one configuration rule of a device contributing to the provision of said service;

a configuration module 116, arranged to configure a service in the visited system and at least one device of the visited system as a function of the nominal configuration acquired.

In a particular embodiment, the configuration device 100 further comprises a module 114 for acquiring an inventory, arranged to acquire an inventory of the visited system, said inventory comprising, for a service offered in the visited system, a service configuration template and, for a device contributing to the provision of a service, a device configuration template.

In the embodiment described previously, the configuration device 100 is incorporated in a configuration server 50. In other embodiments, the configuration device is incorporated in an access gateway 20, 30, or else in a local, vehicle, home automation or other such network management device.

The configuration technique is implemented by means of software and/or hardware components. In this respect, the term "module" can correspond in this document equally to a software component, and to a hardware component or to a set of hardware and/or software components, capable of implementing a function or a set of functions, as described previously for the module concerned.

A software component corresponds to one or more computer programs, one or more subprograms of a program, or, more generally, to any element of a program or a piece of software. Such a software component is stored in memory then loaded and run by a data processor of a physical entity and is capable of accessing the hardware resources of this physical entity (memories, storage media, communication bus, electronic input/out boards, user interfaces, etc).

Likewise, a hardware component corresponds to any element of a hardware assembly (or simply hardware). It can be a programmable or non-programmable hardware component with or without a processor incorporated for the execution of software. It can for example be an integrated circuit, a chip card, an electronic card for the execution of firmware, etc.

In a particular embodiment, the modules 110, 112, 114, 116 are arranged to implement the steps of the configuration method previously described, implemented by the configuration device. They are preferably software modules comprising software instructions for having the steps (or actions) of the configuration method previously described executed, implemented by a configuration device. The invention therefore relates also:

to a program for a configuration device, comprising program code instructions intended to control the execution of the steps (or of the actions) of the configuration method previously described, when said program is run by this configuration device;

a storage medium that can be read by a configuration device on which is stored the program for a configuration device.

The software modules can be stored in or transmitted by a data medium. The latter can be a physical storage medium, for example a CD-ROM, a magnetic diskette or a hard disk, or else a transmissible medium such as an electrical, optical or radio signal, or a communication network.

Although the present disclosure has been described with reference to one or more examples, workers skilled in the art will recognize that changes may be made in form and detail without departing from the scope of the disclosure and/or the appended claims.

The invention claimed is:

1. A method for configuring a system comprising at least one device, said method comprising the following acts performed by a configuring device:

authorizing a user to access said system, called a visited system;

acquiring, for said user, information data representative of a nominal configuration in a reference system, said nominal configuration comprising information relating to a configured service and to at least one configuration rule of a device in the reference system contributing to the provision of said service in the reference system; and configuring the service in the visited system and at least one device of the visited system as a function of the nominal configuration acquired.

2. The configuration method as claimed in claim 1, further comprising acquiring an inventory of the visited system, said inventory comprising, for a service offered in the visited system, a service configuration template and, for a device contributing to the provision of a service, a device configuration template.

3. The configuration method as claimed in claim 2, further comprising complementing said inventory of the visited system by configuring a given service.

4. The configuration method as claimed in claim 1, comprising acquiring a configuration to be applied for a service offered in the visited system and absent from the nominal configuration acquired.

5. The configuration method as claimed in claim 1, wherein the configuring the service in the visited system and said at least one device of the visited system is determined also as a function of a security rule defined in the visited system.

6. A configuration device for configuring a system comprising at least one device, said configuration device comprising:

a processor; and a non-transitory computer-readable medium comprising instructions stored thereon, which when executed by the processor configure the configuration device to:

acquire an authorization for a user to access a system, called a visited system;

acquire a nominal configuration, arranged to acquire, for an authorized user, information data representative of the nominal configuration in a reference system, said nominal configuration comprising information relating to a configured service and at least one configuration rule of a device in the reference system contributing to the provision of said service in the reference system;

configure a service in the visited system and the at least one device of the visited system as a function of the nominal configuration acquired.

7. A non-transitory computer-readable medium comprising a computer program stored thereon, comprising program code instructions to control execution of actions of a configuration method for configuring a system comprising at least one device, when the instructions are executed by a processor of the configuring device, wherein the instructions configure the configuring device to:
- authorize a user to access said system, called a visited system;
- acquire, for said user, information data representative of a nominal configuration in a reference system, said nominal configuration comprising information relating to a configured service and to at least one configuration rule of a device in the reference system contributing to the provision of said service in the reference system; and
- configure the service in the visited system and at least one device of the visited system as a function of the nominal configuration acquired.

* * * * *